(12) United States Patent
McConnell

(10) Patent No.: US 8,910,982 B2
(45) Date of Patent: Dec. 16, 2014

(54) EXHAUST GAS ODOR FOAM BLOCKING STRUCTURE

(71) Applicant: Toyota Motor Engineering & Manufacturing North America, Inc., Erlanger, KY (US)

(72) Inventor: Robert A. McConnell, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/632,218

(22) Filed: Oct. 1, 2012

(65) Prior Publication Data

US 2014/0091584 A1    Apr. 3, 2014

(51) Int. Cl.
*B60R 19/44*    (2006.01)

(52) U.S. Cl.
USPC ......................................................... 293/120

(58) Field of Classification Search
USPC ......... 293/120, 102, 155, 109, 117, 121, 122, 293/154; 296/203.04, 195; 180/309; 181/227

See application file for complete search history.

(56) References Cited

U.S. PATENT DOCUMENTS

| | | | |
|---|---|---|---|
| 6,644,726 B2 * | 11/2003 | Fujii et al. | 296/203.04 |
| 7,458,440 B2 * | 12/2008 | Uegane | 181/228 |
| 7,891,452 B2 * | 2/2011 | Iwamoto et al. | 180/89.2 |
| 7,900,982 B2 | 3/2011 | Moore | |
| 2007/0284896 A1 | 12/2007 | Wakabayashi et al. | |
| 2009/0167036 A1 * | 7/2009 | Sawai | 293/104 |

* cited by examiner

*Primary Examiner* — Joseph D Pape
*Assistant Examiner* — Dana Ivey
(74) *Attorney, Agent, or Firm* — Gifford, Krass, Sprinkle, Anderson & Citkowski, P.C.

(57) ABSTRACT

The present invention includes an improved rear bumper assembly which is designed to help prevent exhaust gases from entering a vehicle. The bumper assembly can have a blocking structure sealed to the bumper cover and the rear of the vehicle. This blocking structure helps push the exhaust gases down and away from the rear of the vehicle which can help carry the exhaust gases away from the vehicle as it travels forward.

7 Claims, 2 Drawing Sheets

EXHAUST GAS ODOR FOAM BLOCKING STRUCTURE

FIELD OF THE INVENTION

The present invention relates to a rear bumper assembly of a vehicle, specifically a rear bumper assembly designed to block exhaust gas odor and keep it from entering a cabin of the vehicle.

BACKGROUND OF THE INVENTION

Modern vehicles are commonly powered by the use of an internal combustion engine. These engines typically burn gasoline, diesel fuel, or other hydrocarbon fuel sources to produce the energy required to power the vehicle's movement. However, in burning these fuels the engine produces exhaust gases which can be obnoxious in odor.

The exhaust gases are typically managed with an exhaust system that carries the exhaust from the engine and releases the exhaust gases out of an exhaust pipe at a rear of the vehicle where the gases ideally are left behind as the vehicle travels down the road.

However, as a vehicle is traveling, the vehicle displaces air during its forward motion. This displacement of air creates a low pressure zone behind the vehicle. The low pressure zone prohibits efficient flow of the exhaust gases which can remain in a stagnant area within the low pressure zone behind the vehicle. As these gases linger they may seep into the body of a vehicle ultimately traveling to a cabin space where vehicle occupants are seated.

As such, an improved device is desired for helping to prevent the exhaust gases of the vehicle from entering into the cabin area.

SUMMARY OF THE INVENTION

The present invention includes an improved rear bumper assembly which is designed to help prevent exhaust gases from entering a vehicle. The rear bumper assembly includes an energy absorbing member which is attached to a reinforcement beam. The energy absorbing member has an elongated wall which extends below the reinforcement beam to a lower back member of the vehicle, the energy absorbing member being sealed to the lower back member of the vehicle on one end and also being sealed to a bumper cover on the other end. The energy absorbing member being sealed both to the bumper cover and the lower back member of the vehicle provides a blocking type structure which prevents the entry of exhaust gases into the trunk area or a lower back area of the vehicle. This blocking structure helps push the exhaust gases down and away from the rear of the vehicle which can help carry the exhaust gases away from the vehicle as it travels forward.

It should be appreciated that the blocking structure preventing the entry of exhaust gases in the vehicle cabin does not have to be made from the energy absorbing member, but rather can be any structure disposed between, and sealed to, the bumper cover and the lower back of the vehicle.

DETAILED DESCRIPTION OF THE INVENTION

Figure 1:
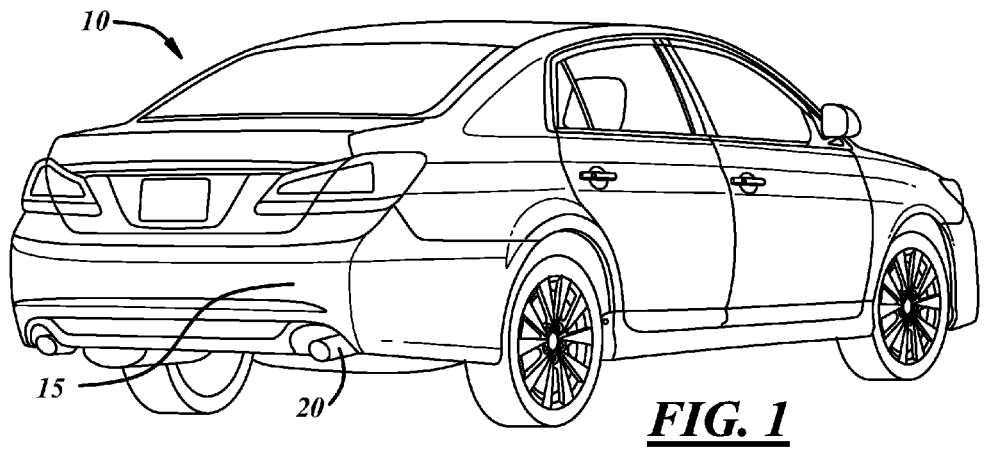
FIG. 1 shows a perspective view of a vehicle having a rear bumper assembly and an exhaust pipe.
Figure 2:
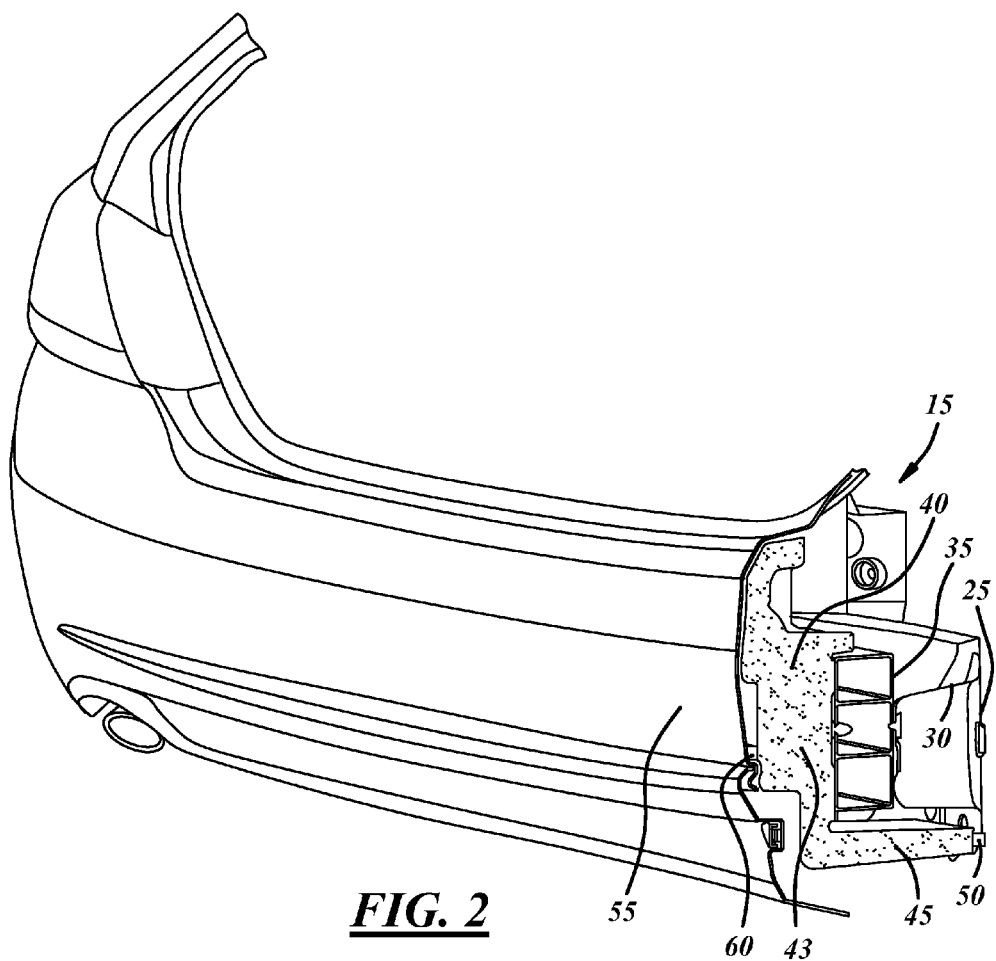
FIG. 2 shows a perspective view of a cutaway of the rear bumper assembly of FIG. 1.

As shown in FIG. 1, the present invention relates to a rear bumper assembly 15 for a vehicle 10 which has a blocking wall 45 operable to help prevent exhaust gases 65 flowing out of an exhaust pipe 20 from entering a cabin 22 of the vehicle 10. To prevent the exhaust gases 65 from entering the cabin 22, a vertical path 66 through the rear bumper assembly 15 can be sealed and/or blocked thereby restricting the flow of the exhaust gases 65. The rear bumper assembly 15 includes an energy absorbing member 40, a reinforcement beam 35, and a bumper cover 55. In the preferred embodiment the blocking wall 45 is a portion of the energy absorbing member 40. Alternatively, the blocking wall 45 can be separately formed from the energy absorbing member 40 and installed separately. Packaging requirements may require that the blocking wall 45 is produced and installed separately.

The rear bumper assembly 15 is attached to a lower back member 25 of the vehicle 10. The lower back member 25 extends transversely across the vehicle 10 and is attached to the vehicle frame (not shown). Attached to the lower back member 25 is a support 30. The support 30 is mounted to a reinforcement beam 35. Attached to the reinforcement beam 35 is an energy absorbing member 40. A bumper cover 55 covers the lower back member 25, the support 30, the reinforcement beam 35, and the energy absorbing member 40. The energy absorbing member 40 has an elongated blocking wall 45 extending underneath the reinforcement beam 35 and the support 30.

In the preferred embodiment, the energy absorbing member 40 is made of an injection molded hard-packed foam. Alternatively, other materials may be used such as plastic, resin, thermoplastic or any other material known to those skilled in the art. The energy absorbing member 40 is designed to absorb and dissipate impact energy from a crash. The energy absorbing member 40 consists of a main portion 43 and the blocking wall 45. The main body of the energy absorbing member 40 also has an upper portion 48 which has a rear surface formed to mate with the interior of the bumper cover 55. The energy absorbing member 40 also has a forward flange 52 extending over the reinforcement beam 35. The energy absorbing member 40 also has a plurality of fingers 54 which are received in the energy reinforcement beam 35 to align the energy absorbing member 40 with the reinforcement beam 35. The blocking wall 45 has a planar portion extending generally horizontally between the inner side of the rear side panels. The blocking wall 45 extends in a fore-aft direction from a lower corner 42 of the main portion 43 to a free edge 46. The elongated blocking wall 45 spans the distance between the main portion 43 and the lower back member 25 of the vehicle, beneath the reinforcement beam 35 and the support 30.

The edge 46 of the blocking wall 45 is sealed in a first sealed area 50 to the lower back member 25. The corner 42 of the blocking wall 45 can also be sealed to the bumper cover 55 in a second sealed area 60. The sealer used in the first sealed area 50 and the second sealed area 60 can be an expanding foam type sealer, an epoxy type sealer, a traditional rubber seal with adhesive, or any other seal known to those skilled in the art, operable to prohibit the flow of exhaust gases through the first sealed area 50 and the second sealed area 60.

The rear bumper cover 55 can be made of injection molded plastic or stamped sheet metal or any other material known to those skilled in the art. The rear bumper cover can be the outermost component of the rear bumper assembly 15.

The lower back member 25 of the vehicle 10 can be a body panel, a trunk structure in a sedan, a rear cargo area in a sport utility vehicle or station wagon or other areas of the like. The lower back member 25 can typically be made of stamped steel although it may also be made with other materials such as aluminum, fiberglass, polymer, carbon fiber, or any other material known to those skilled in the art.

The reinforcement beam 35 can be made of steel, aluminum or any other material known to those skilled in the art. The reinforcement beam can be attached to the lower back member 25 with the support 30. The support 30 can be made of steel, aluminum or any other material known to those skilled in the art.

Figure 3:
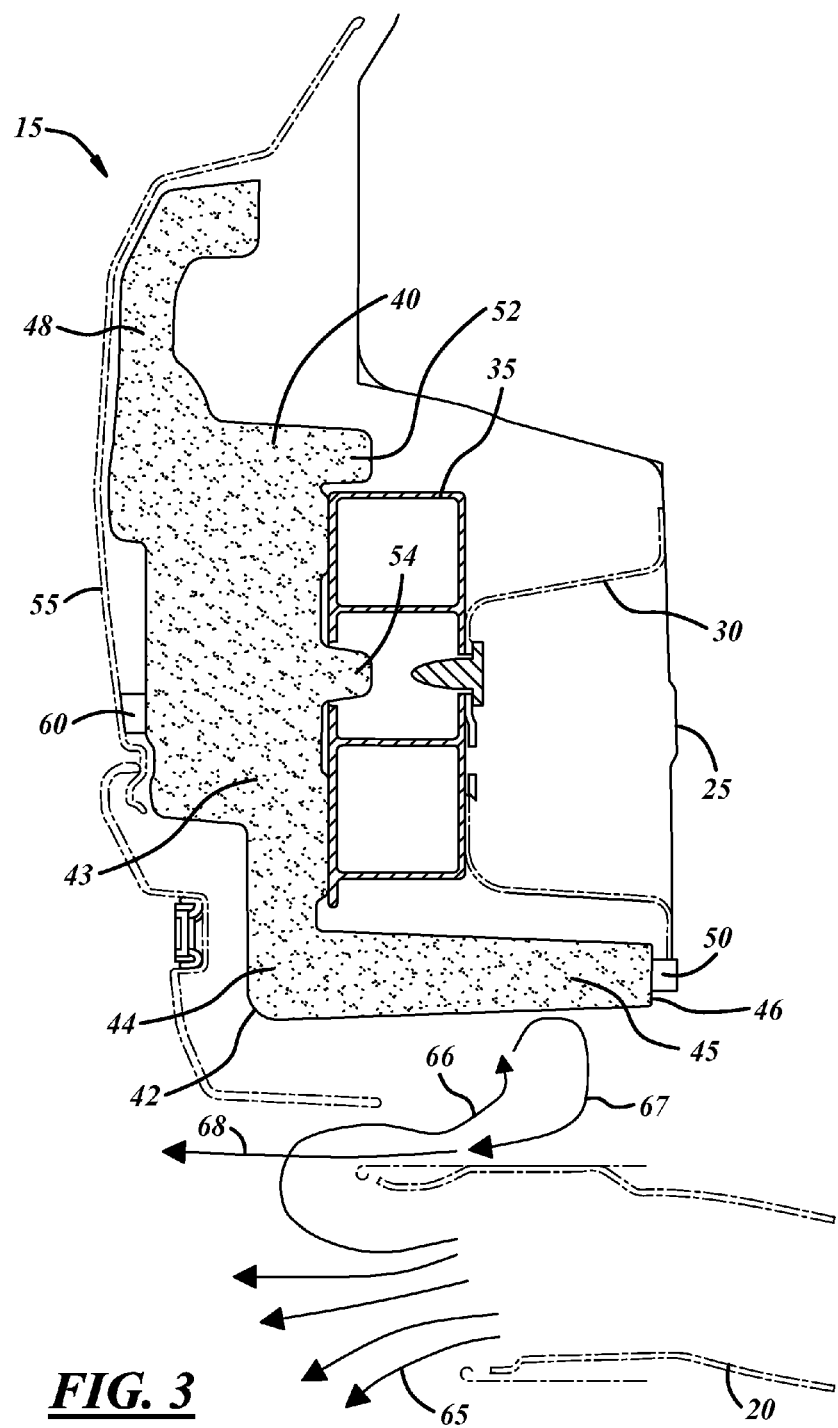
FIG. 3 shows a cross-sectional view of the rear bumper assembly and the exhaust pipe of FIG. 1.

Turning now to FIG. 3, a side cross-sectional view of the rear bumper assembly 15 is shown. The cross-sectional view shown in FIG. 3 includes the exhaust pipe 20 and shows the flow of exhaust gases 65 from the vehicle 10 having the rear bumper assembly 15 of the preferred embodiment of the present invention.

As shown in FIG. 3, the exhaust gases 65 flow out of the exhaust pipe 20 when the internal combustion engine of the vehicle 10 is running. A low pressure area created behind the vehicle 10 as it is traveling can cause the exhaust gases 65 to flow back and behind the rear bumper cover 55 as illustrated by vertical path 66. However, the rear bumper assembly 15 having the elongated blocking wall 45 being sealed in the first sealed area 50 to the lower back member 25 of the vehicle and the corner 42 of the energy absorbing member 40 sealed to the bumper cover 55 in the second sealed area 60 prohibits the exhaust gases 65 from flowing up into the area above the elongated blocking wall 45 of the energy absorbing member 40 in an area near the lower back member 25. This blocking causes the exhaust gases 65 to be pushed down and away from the rear bumper assembly 15 where the exhaust gases 65 may flow away from the vehicle 10, as illustrated by arrows 67 and 68.

While the preferred embodiment utilizes the energy absorbing member 40 with the elongated blocking wall 45 as an exhaust blocking structure, it is appreciated that numerous designs and materials could be used as alternative blocking structures. These alternative blocking structures could be sealed to the lower back member 25 of the vehicle 10 and to the bumper cover 55 to prohibit the flow of exhaust gases 65 from entering the cabin 22 of the vehicle 10.

It is further appreciated that while the cutaway showing the blocking structure is near the exhaust pipe, the blocking structure can be extended from a right to left side of the vehicle 10 along the full length of the rear bumper assembly 15. Further, the blocking wall 45 extending under the reinforcement beam 35 can extend horizontally along the entire length of the reinforcement beam 35, and can extend vertically in an area past the ends of the reinforcement beam 35.

It is understood and appreciated that the foregoing drawings, discussion, and description are illustrative of specific embodiments of the present invention but they are not meant to be limitations upon the practice thereof. Numerous modifications and variations of the invention will be readily apparent to those of skill in the art in view of the teaching presented herein. It is the claims, including all equivalents, which define the scope of the invention.

The invention claimed is:

1. A blocking structure for reducing exhaust fumes from a tailpipe entering a vehicle, the vehicle having a bumper cover and a lower back member, the blocking structure comprising:
   an elongated wall having a planar portion extending between the bumper cover and lower back member of the vehicle, the elongated wall extending over the tailpipe and sealed to the bumper cover and the lower back member to prevent exhaust gases from entering the vehicle.

2. The blocking structure of claim 1 wherein the elongated wall is a portion of an energy absorbing member.

3. The rear bumper assembly blocking structure of claim 2 further comprising:
   a reinforcement beam and a support,
   the reinforcement beam disposed between the energy absorbing member and the lower back member of the vehicle, the reinforcement beam in mechanical communication with the lower back member of the vehicle through the support.

4. The blocking structure of claim 3 wherein the energy absorbing member is partially disposed between the reinforcement beam and the bumper cover, the elongated wall portion of the energy absorbing member extending below and beyond the reinforcement beam and sealed against the lower back member of the vehicle.

5. The blocking structure of claim 4 wherein the energy absorbing member extends a full length of the reinforcement beam.

6. A method for blocking exhaust gas from entering a cabin of a vehicle, the method comprising:
   providing a vehicle having a lower back member;
   providing a bumper cover;
   providing a blocking structure;
   installing the blocking structure and the bumper cover onto the vehicle, the blocking structure being disposed between the lower back member and the bumper cover;
   sealing the blocking structure to the lower back member; and
   sealing the blocking structure to the bumper cover.

7. The method of claim 6 wherein the blocking structure is an energy absorbing member.

* * * * *